United States Patent [19]

Stout

[11] 3,734,545
[45] May 22, 1973

[54] IRRIGATION CONNECTION
[75] Inventor: William A. Stout, Portland, Oreg.
[73] Assignee: Portca Corporation, Portland, Oreg.
[22] Filed: Nov. 5, 1970
[21] Appl. No.: 87,250

[52] U.S. Cl. .......................285/5, 248/87, 239/276,
285/61, 285/376, 285/423
[51] Int. Cl..............................................F16l 55/00
[58] Field of Search...................285/5, 61, 360, 376,
285/6, 423; 248/85, 86, 87, 88; 239/273,
276, 279, 267

[56] References Cited

UNITED STATES PATENTS

| 2,092,674 | 9/1937 | Kennedy | 239/276 X |
| 3,067,950 | 12/1962 | Goldman | 239/279 X |
| 3,425,632 | 2/1969 | Stout | 239/276 X |

FOREIGN PATENTS OR APPLICATIONS 387,634  2/1933  Great Britain.........................285/360

Primary Examiner—Dave W. Arola
Attorney—Buckhorn, Blore, Klarquist & Sparkman

[57] ABSTRACT

A connection for irrigation pipes includes a bell member and a spigot member slidably receivable within the bell member and having an elongated aperture partly registrable with an aperture in the side of the bell member. A cantilever support for the connection comprises a horizontal conduit received through the two apertures and forming a bayonet joint with a tubular extension at the side of the bell member. The cantilever support includes a post for mounting the conduit and for additionally supporting fluid distribution means coupled to receive fluid from the aforementioned conduit.

11 Claims, 6 Drawing Figures

PATENTED MAY 22 1973 3,734,545
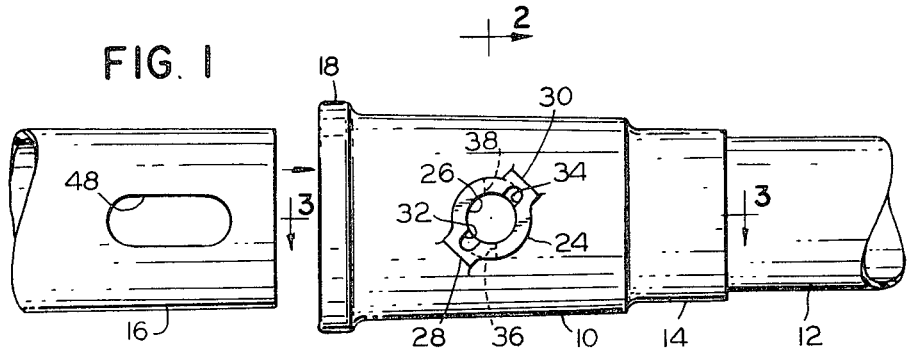
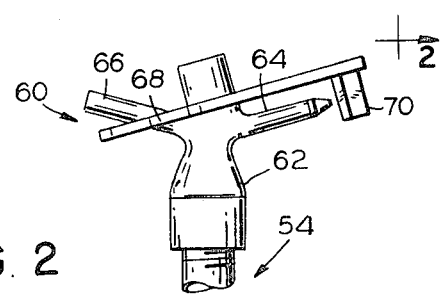
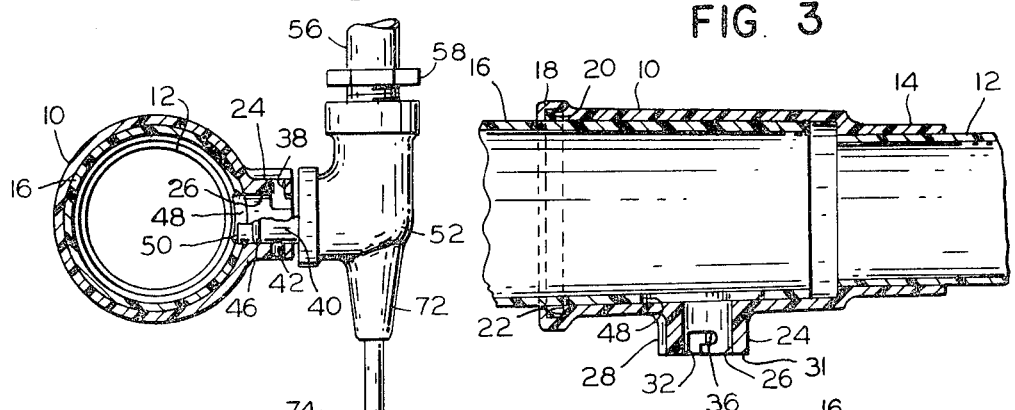
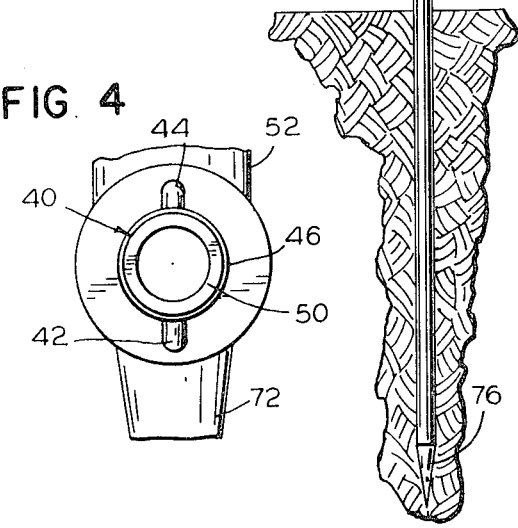
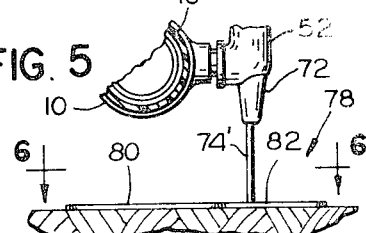
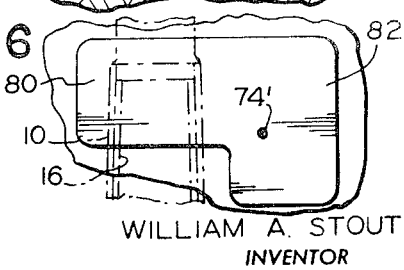
WILLIAM A. STOUT
INVENTOR
BY
BUCKHORN, BLORE, KLARQUIST & SPARKMAN

IRRIGATION CONNECTION

BACKGROUND OF THE INVENTION

Irrigation systems generally comprise an extended pipe or network of pipes for receiving water and delivering the same to fluid distribution means in a field. An irrigation system is desirably portable or movable so that the maximum area can be selectively reached with a minimum of pipes and with a given water supply. Heretofore, piping systems have frequently been made up of plural lengths of pipe which may be disconnected in some manner and moved from one location to another. A junction between two pipes may comprise a threaded joint or rigid coupling, and may also provide a tap for fluid distribution purposes.

While prior art coupling devices have sometimes allowed for expansion and contraction between pipe sections, and have provided for fluid distribution, the fluid distribution connection attained thereby is sometimes somewhat uncertain and subject to misalignment or disengagement. Definite physical support of the pipe connection may not be provided, and physical movement of the coupling is apt to disconnect the distribution means. Furthermore, tapping means employed for withdrawing liquid for distribution from a given joint have sometimes tended to impede the flow of liquid past the same joint to further portions of an irrigation system.

SUMMARY OF THE INVENTION

According to the present invention, an irrigation connection comprises first and second interfitting pipe members each provided with an aperture through which the end of a side conduit extends. This conduit is removably securable to the pipe members and extends horizontally to form part of a cantilever support for the irrigation connection. The same conduit provides a fluid exit adapted for connection to fluid distribution means. Means extending from the ground carries the aforementioned conduit and also suitably supports the fluid distribution means. Definite positioning of the interfitting pipe members is achieved by this configuration, as is a reliable source of fluid for the distribution means. The cantilever support is readily removably for terminating both physical support and a fluid tap, but disconnection need not result from mere physical movement of the aforementioned pipe members. Also, no resistance to fluid flow is presented by tapping the main supply with the present apparatus.

It is accordingly an object of the present invention to provide an irrigation connection device characterized by improved physical support and positioning as well as having an improved fluid tap for distribution purposes.

It is another object of the present invention to provide an improved irrigation connection device characterized by enhanced reliability of fluid supply to distribution means.

It is another object of the present invention to provide an improved irrigation connection device characterized by reliable fluid distribution without interference with the normal flow of fluid past said connection device.

It is a further object of the present invention to provide an irrigation connection device having distribution coupling means for engaging the device in improved sealing relation to minimize loss of fluid.

The subject matter which I regard as my invention is particularly pointed out and distinctly claimed in the concluding portion of this specification. The invention, however, both as to organization and method of operation, may best be understood by reference to the following description taken in connection with the accompanying drawings wherein like reference characters refer to like elements.

DRAWINGS

FIG. 1 is a side view of a part of an irrigation connection device according to the present invention, illustrated in partially broken-away fashion, FIG. 2 is a transverse cross-sectional view taken at 2—2 in FIG. 1, and further illustrating cantilever support means according to the present invention for providing exit to fluid distribution means;

FIG. 3 is a longitudinal cross section of a portion of an irrigation connection device according to the present invention, wherein slidable pipe members are telescoped in interfitting relation;

FIG. 4 is an end view of a conduit comprising part of cantilever support means according to the present invention;

FIG. 5 is a transverse cross section of an alternative construction of an irrigation connection device and support according to the present invention; and FIG. 6 is a cross-sectional view taken at 6—6 in FIG. 5.

DETAILED DESCRIPTION

Referring to the drawings, an irrigation connection according to the present invention includes a first cylindrical pipe member or bell 10 joined to a first pipe 12 at a first open end of the bell. The bell 10, at the first end thereof, is suitably narrowed in diameter to provide a collar 14 tightly receiving pipe 12 therewithin. Bell 10 is also open at the second or larger end thereof for slidably receiving a second cylindrical spigot pipe member 16 which may be joined to the end of a second pipe (not shown). In a typical irrigation system, a number of pipe lengths will be employed wherein each such length of pipe is provided with a bell on one end and a spigot member on the other, adapted for interconnection.

The spigot member 16 is open ended toward the bell (to the right in FIGS. 1 and 3), and is fairly closely received within the bell up to the location of collar 14. Bell 10 is provided with a radial flange 18 proximate its larger end for accommodating a chevron seal 20, within a circumferential slot 22, for engaging the exterior of member 16 when members 10 and 16 are telescoped as illustrated in FIG. 3.

Bell 10 is provided with a single tubular extension 24 located at one side of the bell in substantially perpendicular relation thereto. Extension 24 has an inner bore 26 communicating with the interior of the bell and forming a side outlet aperture for the bell. On either side of tubular extension 24 are disposed longitudinal bosses 28 and 30 accommodating longitudinal grooves 32 and 34, each groove starting at the outer end 31 of extension 24 and proceeding inwardly along bore 26 part way to the wall of bell 10. At this point, partially circumferential grooves 36 and 38 branch from the aforementioned grooves 32 and 34, with each of grooves 36 and 38 extending arcuately in a counter-clockwise sense for approximately 45°. The grooves 36 and 38 in the illustrated embodiment extend circumferentially past the bosses 28 and 30 and so are open to the exterior of extension 24 toward the groove ends. Tubular extension 24 having the above described L-shaped groove configuration provides a bayonet socket for receiving a mating structure in locking relation, as hereinafter more fully described. The bosses 28 and 30 are suitably disposed opposite one another at an angle of approximately 45° with the axis of bell 10 whereby mating structure including a pair of pins will first engage the grooves 32 and 34 of the bayonet socket at such angle, followed by rotation of the mating structure into the partially circumferential grooves for making an angle of approximately 90° with the axis of bell 10.

As illustrated in FIG. 2, tubular extension 24 is adapted for slidably receiving a cylindrical conduit 40 carrying radially outwardly extending pins 42 and 44. The conduit 40 is fairly closely received within the inner bore 26 of tubular extension 24, and is also provided with an O-ring seal 46, disposed around a circumferential slot, for engaging the inner bore 26 in sealing relation. The pins 42 and 44 are receivable within grooves 32 and 34 as the conduit 40 is inserted into bore 26 until pins 42 and 44 reach the end of the grooves. Then, the conduit 40, which is partially rotatable within bore 26, may be turned in a counterclockwise direction for rotating pins 42 and 44 into grooves 36 and 38 and to the position illustrated in FIG. 2. At this time, the conduit 40 will be substantially secured against axially outward movement thereof with respect to bell 10. The structure comprising conduit 40, carrying pins 42 and 44, together with the aforementioned bayonet socket, comprises a rotatable locking means in the form of a bayonet joint.

Spigot member 16 has an elongated slot 48 in a side thereof which is at least partially registrable with the aperture in bell 10 provided by bore 26. Thus, slot 48 has a width about as large as the diameter of bore 26, but a length which is longer than such diameter. When conduit 40 is received within bore 26 in locking relation as illustrated in FIG. 2, the end 50 of conduit 40 extends within slot 48, thereby slidably securing members 10 and 16. Member 16 is free to slide for a distance equaling the difference between its length and the outside diameter of conduit 40. This freedom of longitudinal movement between pipe sections advantageously allows for contraction and expansion of pipe sections in an irrigation system or the like, without buckling of a pipe run at high temperatures or disconnection when contraction takes place. The end 50 of pipe 40 advantageously extends no farther into slot 48 than is necessary for engaging slot 48, with the conduit 40 offering substantially no impedance to the flow of liquid through the pipe connection comprising members 10 and 16. Both ends of conduit 40 are open for providing exit of fluid from the pipe connection.

The right-hand end of conduit 40, as viewed in FIG. 2, is suitably integral with a pipe fitting which comprises a pipe elbow 52 in the case of the FIG. 2 illustration. The pipe elbow provides a fluid connection to a vertical extension generally indicated at 54. Extension 54 suitably includes a vertical pipe 56 threaded on both ends, and is illustrated as broken away in FIG. 2. The lower end of pipe 56 is threadably received in elbow 52, with pipe 56 having a hexagonal head member 58 secured to the exterior thereof whereby the pipe can be rotated into engagement with the elbow.

A fluid distribution means 60 is threadably secured at the upper end of pipe 56. Such fluid distribution means may be of a standard type and is here illustrated as comprising a rotatable head 62 having a forward nozzle 64 and a rearward arm 66 used for applying turning motion to the head and directing a stream of fluid from nozzle 64. A pivoting arm 68, rotatably mounted on head 62, is provided with a front deflector 70 and is yieldably urged (by means not shown) in a direction for locating deflector 70 in the stream of fluid from nozzle 64. As the deflector encounters the fluid stream, it will be forced in a direction causing pivoting arm 68 to strike arm 66 thereby rotating head 62 a short arcuate distance. This type of mechanism is well known in the art and does not form any part of the present invention.

The elbow 52 is further provided with a depending portion 72 suitably drilled to receive a vertical riser or post 74. Post 74 is desirably pointed or spiked at the bottom thereof, as illustrated at 76, whereby the same way be driven into the ground in a vertical position for supporting elbow 52 thereabove. With conduit 40 threadably joined to elbow 52, and also connected to tubular extension 24 in locking engagement, the rod, elbow, and conduit form a cantilever support for the connection comprising the pipe members 10 and 16. Of course, the same cantilever support also provides fluid exit from the pipe connection as well as support for the fluid distribution means. The cantilever support locates the pipe connection comprising members 10 and 16 at a predetermined level with respect to the ground, and moreover, insures a secure fluid connection between pipe member 10 and the fluid distribution means. Thus, once the cantilever support is disposed in the manner illustrated in locking relation with bell 10, accidental disruption of fluid flow is virtually prevented. Furthermore, since the branch connection is made to only one side of bell 10, satisfactory sealing against loss of liquid is enhanced, and as hereinbefore indicated, the conduit 40 does not impede fluid flow down the supply main, i.e., through members 10 and 16. The cantilever support advantageously disposes the main pipeline to the side of post 74 and the fluid distribution means carried thereby, instead of requiring these to be in line which might prevent proper placement of the fluid distribution means with respect to a crop.

In use of the present connection means, lengths of pipe provided with members 10 and 16 are disposed in end-to-end relation and a member 10 is inserted into the larger open end of member 10. The member 16 is so oriented when inserted that slot 48 will substantially register with the aperture formed by bore 26. Now, the cantilever support comprising rod 74, elbow 52, and conduit 40 (as well as extension 54 as desired), is oriented so that conduit 40 can be properly inserted into bore 26. Thus, the axial line along rod 74 and extension 54 will be aligned approximately between bosses 28 and 30, and pins 42 and 44 are inserted fully to the ends of grooves 32 and 34. The whole cantilever support comprising elements 74, 52 and 40 is then rotated by 45° in a counterclockwise direction so that pins 42 and 44 are received in grooves 36 and 38, and rod 74 is disposed at right angles to the axis of member 10. The rod 74 may be thrust into the ground as illustrated in FIG. 2. At this time, member 10, conduit 40 and rod 74 are mutually disposed at approximate right angles to one another. Ordinarily, member 10 as well as conduit 40 will both be disposed horizontally, that is, in parallel relation to the ground, with conduit 40 extending horizontally to the side of member 10. Rod 74 will, of course, then be vertically disposed. It is understood the terms "horizontal" and "vertical" are necessarily approximate since it is obvious rod 74 may be thrust into the ground at some angle to the vertical in a given instance.

When the irrigation system is to be moved or dismantled, the irrigation connection device, together with rod 74, may be moved upwardly for disengaging the latter from the ground. It is noted that such movement will not break the fluid connection between the irrigation connection device and the fluid distribution means. If desired, the construction may be moved intact, or, alternatively, the cantilever support comprising elements 74, 52, and 40 may be rotated in a clockwise direction by 45° after which the conduit 40 is withdrawn. This will disconnect the fluid passage and will also unlock the members 16 and 10 from one another whereby the latter may be physically disconnected.

FIGS. 5 and 6 illustrate alternative ground engaging means comprising a stand in the form of a flat metal plate 78 joined at right angles to the lower end of a rod 74' which is in turn joined to depending portion 72. The plate 78 is L-shaped, having a portion 80 adapted for positioning underneath the pipe connection 10,16, and a second portion 82 extending longitudinally along and to the side of the pipe connection. Rod 74' joins the plate near the interior angular intersection of the two portions.

The L-shaped construction illustrated in FIGS. 5 and 6 permits orientation of rod 74' at an angle of 45° with respect to the pipe connection for insertion and removal of conduit 40 from extension 24 as hereinbefore described. At such time, portion 82 will "miss" the pipe connection as the same is rotated in the direction of the pipe connection, while plate portion 80 is narrow enough in this direction along the pipe whereby the same may be rotated to an angle of 45° without resulting in interference between the connection and the plate.

As an additional advantage of the present construction, the cantilever support may be replaced in a given instance by a bayonet plug, not shown, when neither fluid distribution nor support is needed at a given location. Such plug will have substantially the same construction as conduit 40, as illustrated in FIG. 4, except it will be closed rather than hollow. Therefore, such plug is not separately illustrated. As in the case of conduit 40, the plug of the foregoing type would not impede the flow of liquid through the pipe connection, but would merely secure members 10 and 16 together.

In general, the major pipe members in the illustrated connection will be formed of plastic, such as the elements designated by reference numerals 10, 12, and 16. The conduit 40, elbow 52, post 74, and fluid distribution means 54 are suitably metal parts. However, these materials of construction are suggested by way of example only, and not in a limiting sense.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

What is claimed is:
1. An irrigation connection comprising:
   first and second pipe members forming the ends of pipes making up part of an irrigation system, one of said members being removably inserted in the other in slidably telescoped interfitting relation,
   a cantilever support supporting said irrigation connection including a conduit extending from one side of one of said pipe members in removably securable support relation with at least said one of said pipe members and in engaging relation with the other of said pipe members preventing telescoping removal of one member from the other while providing a fluid connection therefrom for supplying fluid to fluid distribution means,
   and means extending above the ground carrying said conduit.

2. The irrigation connection according to claim 1 including a rotatable locking joint between said conduit and said one of said pipe members for providing said removably securable support relation.

3. The irrigation connection according to claim 2 wherein said rotatable locking joint comprises a bayonet joint to provide said removably securable support relation, wherein said conduit is provided with at least one radially outwardly extending pin and said one of said pipe members is provided with a tubular extension having an inside diameter for receiving the end of said conduit and having an axial slot, and a joining partially circumferential slot, for receiving said pin.

4. An irrigation connection comprising:
   first and second interfitting pipe members forming the ends of pipes making up part of an irrigation system, wherein said pipe members are telescoped in interfitting relation, each of said pipe members being provided with an aperture, the aperture of one of said pipe members being in alignment with the other aperture, with said pipe members in interfitting relation,
   a cantilever support supporting said irrigation connection including a conduit extending from one side of one of said pipe members in removably securable relation with at least said one of said pipe members, wherein the end of said conduit in the removably secured relation of said conduit extends through both apertures in both said pipe members securing the pipe members together, while providing a fluid connection therefrom for supplying fluid to fluid distribution means,
   and means extending above the ground carrying said conduit.

5. An irrigation connection comprising:
   a first horizontal pipe member and a second horizontal pipe member slidably received within one end of the first pipe member, the first pipe member having an aperture in one side thereof and the second pipe member having an aperture longitudinally elongated with respect to the aperture in the first pipe member and at least partly registrable with the aperture in the first pipe member as the second pipe member is received within the first pipe member.
   and a cantilever support for said irrigation connection including a normally substantially vertical post and a horizontal conduit extending from said post at substantially right angles with respect to said post and said first pipe member, said horizontal conduit having an outside diameter not greater than the smallest inside diameter of the apertures in said first and second pipe members, said horizontal conduit having an open end extending through the aperture in the first pipe member in removably securable support relation with said first pipe member, and when in secured relation extending into the elongated aperture of said second pipe member for providing a fluid exit from a said pipe member while limiting longitudinal movement of said second pipe member to not more than the difference between the diameter of the conduit and the length of the longitudinal aperture, and fluid distribution means supported by said post, the cantilever support including fluid connection means for connecting said fluid distribution means to said horizontal conduit to receive fluid therefrom.

6. The irrigation connection according to claim 5 including a rotatable locking joint between said horizontal conduit and said first pipe member to provide said removably securable support relation, said conduit being axially insertable into engagement with said first pipe member in a first rotatable position of the said cantilever support when said post is disposed at an angle to the vertical, said locking joint providing locking of said conduit against removal from said first pipe member as said cantilever support is rotated to a second, normal position thereof with said post disposed substantially vertically for engagement with the ground therebelow.

7. The irrigation connection according to claim 6 wherein said rotatable joint comprises a bayonet joint, said first pipe member being provided with a tubular extension having at least a first axial groove beginning at the outer end of the inner diameter of said extension and a partially circumferential groove joining the latter, and at least one pin disposed radially outwardly proximate one end of said conduit adapted for reception sequentially into said axial and partially circumferential grooves for locking said cantilever support in place.

8. An irrigation connection comprising:

a bell member adapted for connection at a first end to a first length of pipe, and having a second open end slidably receiving the open end of a second length of pipe therewithin, said bell member having an aperture in only a first side thereof, said second length of pipe having an elongated opening in one side thereof registering with said aperture as the end of the second length of pipe is inserted in said bell member, a substantially horizontal open ended conduit removably insertable into said aperture in the side of said bell member as well as through said opening in said second length of pipe for communicating with the interior of said bell member to provide fluid exit from said bell member while at the same time slidably securing the end of said second length of pipe within said bell member, said conduit being capable of limited rotation around its longitudinal axis with respect to said aperture, a means extending above the ground and joined to said conduit for supporting said conduit in a substantially horizontal position above the ground and adjacent said first side of said bell member, said last mentioned means further including means for supporting fluid distribution means as coupled to said conduit, and rotational engaging means between said conduit and said bell member for securing said conduit against longitudinal movement thereof in a direction horizontally away from said bell member in at least one position of rotation of said conduit while permitting longitudinal movement including insertion of said conduit into and removal of said conduit out from said aperture in another position of rotation of said conduit.

9. The irrigation connection according to claim 8 wherein said means extending above the ground and joined to said conduit comprises a rod adapted to be driven into the ground for supporting said conduit, wherein said rod is rotatable about the axis of said conduit prior to and subsequent to engagement of said rod with the ground for the purpose of engaging and disengaging said conduit with said bell member through operation of said rotational engaging means, said rod extending vertically from the ground when the rotational engaging means secures said conduit against longitudinal movement.

10. The irrigation connection according to claim 8 wherein said bell member is provided with a tubular extension on said first side thereof communicating with the interior thereof, the inside bore of said tubular member comprising said aperture in said bell member, said tubular extension having a pair of substantially longitudinal grooves circumferentially spaced apart around its inside wall and starting at the outer end of the tubular extension, and a pair of partially circumferential grooves branching from said longitudinal grooves at points inwardly from the outer end of said tubular extension, aid conduit being provided with a pair of radially outwardly extending pins positioned for engaging said longitudinal and then said partially circumferential grooves in interfitting relation to provide said rotational engaging means.

11. The irrigation connection according to claim 8 wherein said means extending above the ground and joined to said conduit comprises a rod attached to a flat plate adapted for resting on the ground and disposed at right angles to the rod, wherein said rod is rotatable about the axis of said conduit prior to and subsequent to placement of said plate upon the ground for the purpose of engagement and disengagement of said conduit with said bell member through operation of said rotational engaging means, said plate being L-shaped, having a first relatively narrow portion adapted for extension underneath the pipe connection and a second portion for disposition longitudinally of said pipe connection and to the side thereof along the ground in the direction of rotation of said rod for disengaging said conduit from said bell member, said rod being joined to said plate proximate the interior angular junction of said two portions.

* * * * *